000
United States Patent Office 3,242,136
Patented Mar. 22, 1966

3,242,136
AMMONIUM SALTS OF AROMATIC POLYAMIDE-ACIDS AND PROCESS FOR PREPARING POLYIMIDES THEREFROM
Andrew Laszlo Endrey, Parma, Ohio, assignor to E. I. du Pont de Nemours and Company, Wilmington, Del., a corporation of Delaware
No Drawing. Filed Nov. 9, 1962, Ser. No. 236,721
15 Claims. (Cl. 260—47)

This application is a continuation-in-part of my copending application Serial No. 169,106, now issued as U.S. Patent 3,179,630, which was filed January 26, 1962.

This invention relates to novel polymeric materials and has as its primary object a novel method for the preparation of polyimides. Other objects will appear hereinafter.

The resulting polyimides are characterized by a recurring unit having the following structural formula:

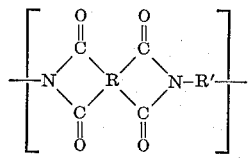

wherein R is a tetravalent radical contining at least six carbon atoms in a ring, said ring characterized by benzenoid unsaturation, the four carbonyl groups being attached to separate carbon atoms and each pair of carbonyl groups being attached to adjacent carbon atoms in a 6-membered benzenoid ring of the R radical; and wherein R' is a divalent organic radical containing at least two carbon atoms.

The polyimides, prepared by the process of the present invention, display outstanding physical and chemical properties which make them very useful as shaped structures.

The polyimides are prepared by reacting at least one organic diamine having the structural formula:

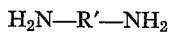

$$H_2N—R'—NH_2$$

wherein R' is a divalent radical containing at least 2 carbon atoms, the two amino groups of said diamine each attached to separate carbon atoms of said divalent radical; with at least one tetracarboxylic acid dianhydride having the structural formula:

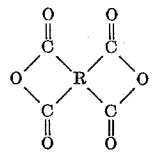

wherein R is a tetravalent radical containing at least 2 carbon atoms, no more than 2 carbonyl groups of said dianhydride attached to any one carbon atom of said tetravalent radical; in an organic solvent for at least one of the reactants, the solvent being inert to the reactants, preferably under anhydrous conditions, for a time and at a temperature below 175° C. sufficient to form the corresponding polyamide-acid having an inherent viscosity of at least 0.1, preferably 0.3–5; adding a tertiary amine, e.g., triethylamine, in the amount necessary to form a composition containing the salt derivative of the polyamide-acid, e.g., the triethylamine salt of the polyamide-acid; and then converting the resultant composition to the polyimide, the polyimide also having an inherent viscosity of at least 0.1, preferably 0.3–5. It should be understood that the tertiary amine can be added at any stage in the process. Thus, it can form all or part of the solvent for the polymerization or it may be added after polymerization.

The inherent viscosity of the polyimide is measured at 30° C. as a 0.5% solution in a suitable solvent for the polyimide. For many polyimides of this invention, concentrated (96%) sulfuric acid is a suitable solvent. However, the solvent may be selected from a group consisting of concentrated sulfuric acid, fuming nitric acid, the monohydrate of sym-dichlorotetrafluoroacetone and the hydrate of monochloropentafluoroacetone. It has been found that if the polyimide is not soluble in concentrated sulfuric acid to the extent of 0.5%, then its inherent viscosity in a suitable solvent can usually be considered to be greater than 0.1. For example, poly bis (4 aminophenyl) ether pyromellitimide prepared by this invention may not be soluble to the extent of 0.5% in concentrated sulfuric acid, yet it displays an inherent viscosity greater than 0.1 when measured as 0.5% solution in the monohydrate of sym-dichlorotetrafluoroacetone or in fuming nitric acid.

It is also preferred to form a shaped structure of the polyamide-acid salt composition prior to converting the polyamide-acid salt to the polyimide. In any event, the conversion of the polyamide-acid salt to the polyimide may be accomplished by a heat treatment or any of the chemical treatments or combinations of treatments as described hereinafter. It should also be understood that the polymers may be modified with inert materials prior to or subsequent to shaping. These modifying agents may be selected from a variety of types such as pigments, dyes, inorganic and organic fillers, etc.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapeable compositions. The particular temperature below 175° C. that must not be exceeded for any particular combination of diamine, dianhydride, solvent and reaction time to provide a reaction product composed of sufficient polyamide-acid to be converted to a shapeable salt will vary but can be determined by a simple test by any person of ordinary skill in the art. However, to obtain the maximum inherent viscosity, i.e., maximum degree of polymerization, for any particular combination of diamine, dianhydride, solvent, etc., and thus produce shaped articles such as films and filaments of optimum toughness, it has been found that the temperature throughout the reaction should be maintained below 60° C., preferably below 50° C.

The details of a preferred process involve premixing equimolar amounts of the diamine and the dianhydride as dry solids and then adding the mixture, in small proportions and with agitation, to the organic solvent. Premixing the ingredients and then adding them in small proportions to the solvent provides relatively simple means for controlling the temperature and the rate of the process. Since the reaction is exothermic and tends to accelerate very rapidly, it is important to regulate the additions to maintain the reaction temperature at the desired level. However, the order of addition may be varied. After premixing the diamine and the dianhydride, the solvent may be added to the mixture with agitation. It is also possible to dissolve the diamine in the solvent while agitating, preheat the solution and then add the dianhydride at a sufficiently slow rate to control the reaction temperature. Ordinarily, in this latter process the last portion of the dianhydride is added with part of the organic solvent. Another possible method involves adding the reactants to the solvent in small proportions, not as a premixture, but alternately; first diamine, then dianhydride, then diamine, etc. In any event, it is advisable to agitate the solution polymerization system after the additions are completed until maximum viscosity denoting maximum polymerization is obtained. Still another process involves dissolving the diamine in one portion of a solvent and the dianhydride in another portion of the same or another solvent and then mixing the two solutions.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity of the polyamide-acid is measured at 30° C. at a concentration of 0.5% by weight of the polymer in a suitable solvent, e.g. N,N-dimethyl-acetamide. To calculate inherent viscosity, the viscosity of the polymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. For forming the ultimate salt composition into shaped articles, it has been found that the most successful results are obtained when the solvent represents at least 60% of the final polymeric solution. That is, the solution should contain 0.05–40% of the polymeric component.

The tertiary amines suitable for preparing the ammonium salts of the polyamide-acids are tertiary amines having a basic ionization constant greater than $1 \times 10^{-7}$ and having the following formula:

wherein
$R^1$ is alkyl having at least 2 carbon atoms, aryl or cycloalkyl;
$R^2$ and $R^3$ are each alkyl, aryl or cycloalkyl.

Specific preferred amines include triethylamine, N,N-dimethyldodecylamine, N,N-dimethylbenzylamine, N,N-dimethylethylamine, tri-n-butylamine, N,N-dimethylcyclohexylamine, N,N-dimethylaminoethanol.

The shaped articles composed of a substantial amount of the polyamide-acid salt, usually at least 50% of the polyamide-acid salt, are then converted to the respective polyimide shaped articles.

It should also be understood that instead of shaping the polyamide-acid salt composition into the usual articles, the polyamide-acid salt composition in the solvent may be used as a liquid coating composition. Such coating compositions may be pigmented with such compounds as titanium dioxide in amounts of 5–200% by weight. These coating compositions may be applied to a variety of substrates, for example, metals, e.g., copper, brass, aluminum, steel, etc., the metals in the form of sheets, fibers, wires, screening, etc.; glass in the form of sheets, fibers, foams, fabrics, etc.; polymeric materials, e.g., cellulosic materials such as cellophane, wood, paper, etc., polyolefins such as polyethylene, polypropylene, polystyrene, etc., polyesters such as polyethylene terephthalate, etc., perfluorocarbon polymers such as polytetrafluoroethylene, copolymers of tetrafluoroethylene with hexafluoropropylene, etc., polyurethanes, all polymeric materials in the form of sheets, fibers, foams, woven and non-woven fabrics, screening, etc.; leather sheets; etc. The polyamide-acid salt coatings are then converted to polyimide coatings by one or more of the processes to be described.

One process, the preferred one, comprises converting the polyamide-acid salts to polyimides by heating above 50° C., preferably 100–200° C. Heating may be conducted for a period of a few seconds to several hours. It has been found that this process of heating the polyamide-acid salt to convert to the polyimide can be performed at a lower temperature, in a shorter time and with less degradation than the process wherein the polyamide-acid is used.

A second process for converting the polyamide-acid salt composition to the polyimide thereof is a chemical treatment and involves treating the polyamide-acid salt composition with a dehydrating agent alone or in combination with a tertiary amine, e.g., acetic anhydride or an acetic anhydride-pyridine mixture. The shaped article can be treated in a bath containing the acetic anhydride-pyridine mixture. The ratio of acetic anhydride to pyridine may vary from just above zero to infinite mixtures. It is believed that the pyridine functions as a catalyst for the action of the cyclizing agent, the acetic anhydride. Other possible dehydrating agents for use include propionic anhydride, butyric anhydride and similar fatty-acid anhydrides. Other tertiary amine catalysts include triethylamine, isoquinoline, α, β or gamma-picoline, 2,5-lutidine, etc.

As a third process of conversion, a combination treatment may be used. The polyamide-acid salt may be partially converted to the polyimide in a chemical conversion treament and then cyclization to the polyimide may be completed by subsequent heat treatment. The conversion of the polyamide-acid salt to the polyimide in the first step should be limited if it is desired to shape the composition into suitable forms. After shaping, the completion of the cyclization of the polyimide/polyamide-acid salt may be accomplished.

The presence of polyimides is evidenced by their insolubility in cold basic reagents as opposed to the rapid solubility of the polyamide-acid. Their presence is also apparent if the polyamide-acids are scanned with infrared during conversion of the polyimide. The spectra initially show a predominating absorption band at ca. 3.1 microns due to the NH bond. This band gradually disappears and as the reaction progresses, the polyimide absorption bands appear, a doublet at ca. 5.64 and 5.89 microns and a peak at 13.85 microns.

The starting materials for forming the products of the present invention are specific organic diamines and tetracarboxylic acid dianhydrides. The organic diamines are characterized by the formula H₂NR'—NH₂ wherein R' is a divalent benzenoid radical, preferably selected from the group consisting of

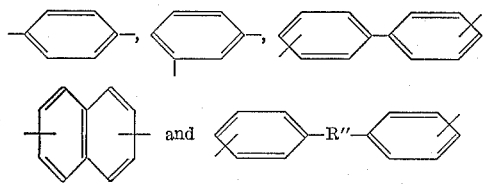

where R'' is a divalent isoelectronic configuration comprising elements from Rows IVa, Va and VIa of the Periodic Table having an atomic weight of 12–33, specifically where R'' is selected from the group consisting of an alkylene chain having 1–3 carbon atoms,

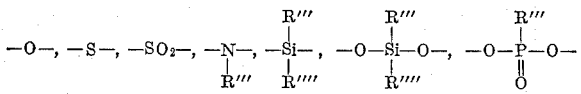

and

wherein R''' and R'''' are selected from the group consisting of alkyl and aryl. Among the diamines which are suitable for use in the present invention are: 4,4'-diamino-diphenyl propane, 4,4'-diamino-diphenyl methane, benzidine, 3,3'-dichloro-benzidine, 4,4'-diamino-diphenyl sulfide, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4-diamino-diphenyl phenyl phospine oxide, 4,4'-diamino-diphenyl N-methyl amine, 4,4-diamino-diphenyl N-phenyl amine and mixtures thereof.

The tetracarboxylic acid dianhydrides are characterized by the following formula:

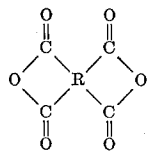

wherein R is a tetravalent organic radical containing at least 6 carbon atoms characterized by benzenoid unsaturation, wherein the 4 carbonyl groups of the dianhydride are each attached to separate carbon atoms and wherein each pair of carbonyl groups is directly attached to adjacent carbon atoms in the R group to provide a 5-membered ring as follows:

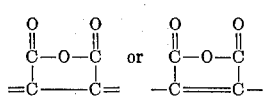

Illustrations of dianhydrides suitable for use in the present invention include: pyromellitic dianhydride, 2,3,6,7-naphthalene tetracarboxylic dianhydride, 3,3',4,4'-diphenly tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride, bis(3,4-dicarboxyphenyl) ether dianhydride, naphthalene-1,2,4,5-tetracarboxylic dianhydride, 2,2-bis(2,3-dicarboxyphenyl) propane dianhydride, 1,1-bis(2,3-dicarboxyphenyl) ethane dianhydride, 1,1-bis(3,4-dicarboxyphenyl) ethane dianhydride, bis (2,3-dicarboxyphenyl) methane dianhydride, bis(3,4-dicarboxyphenyl) methane dianhydride, benzene-1,2,3,4-tetracarboxylic dianhydride, pyrazine-2,3-5,6-tetracarboxylic dianhydride, 3,4,3',4'-benzophenone tetracarboxylic dianhydride, etc.

The solvents useful in the solution polymerization process for synthesizing the intermediate polyamide-acid compositions in the preferred process of preparing the polyimides are the organic solvents whose functional groups do not react with either of the reactants (the diamines or the dianhydrides) to any appreciable extent. Besides being inert to the system and, preferably, being a solvent for the product, the organic solvents must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with poor solvents such as benzene, benzonitrile, dioxane, xylene, toluene and cyclohexane or in combination with the tertiary amine.

The invention will be more clearly understood by referring to the examples which follow. These examples, which illustrate specific embodiments of the present invention, should not be construed to limit the invention in any way.

For convenience, abbreviations will be used wherever possible. Thus, DDP represents 4,4'-diamino-diphenyl propane; DDM, 4,4'-diamino-diphenyl methane; MPD, meta-phenylene diamine; PPD, para-phenylene diamine; POP, 4,4'-diamino-diphenyl ether; PMDA, pyromellitic dianhydride; BTDA, 3,3',4,4'-benzophenone tetracarboxylic dianhydride; DMF, N,N-dimethylformamide; DMA, N,N-dimethylacetamide; P, pyridine; and AA, acetic anhydride.

The examples are summarized in Table I. The details of the examples, where some of the compositions are shaped into useful structures such as films, follow the table.

The preparations of some of the important ingredients used in the examples are given below:

The pyromellitic dianhydride used was obtained as white crystals by sublimation of the commercial product through silica gel at 220–240° C. and 0.25–1 mm. mercury pressure.

N,N-dimethylformamide and N,N-dimethylacetamide were prepared by fractional distillation from phosphorous pentoxide; the fraction distilling at 47.5° C. and 17 mm. pressure being N,N-dimethylformamide and the fraction distilling at 73° C. and 30 mm. pressure being N,N-dimethylacetamide.

TABLE I.—SUMMARY OF EXAMPLES

| Example | Gms. Reactants | | Mls. Solvent | Conversion |
|---|---|---|---|---|
| | Diamine | Dianhydride | | |
| 1 [1] | 10.35 DDP | 10.0 PMDA | 50 DMF | Heat. |
| 2 [1] | 3.0 DDM | 3.3 PMDA | 50 DMF | Do. |
| 3 [2] | 10.35 DDP | 10.0 PMDA | 125 DMF | AA/P. |
| 4 [2] | {8.7 MPD / 3.7 PPD} | 25.0 PMDA | 150 DMF | AA/P. |
| 5 [2] | 6.2 MPD | 12.5 PMDA | 75 DMA | AA/P/cyclohexane. |
| 6 [2] | 6.2 MPD | 12.5 PMDA | 75 DMA | AA/P/acetonitrile. |
| 7 [2] | 6.2 MPD | 12.5 PMDA | 75 DMA | AA/P/chloroform. |
| 8 [2] | 6.2 MPD | 12.5 PMDA | 75 DMA | AA/P/benzene. |
| 9 [2] | 6.2 MPD | 12.5 PMDA | 180 DMA | AA/P. |
| 10 [2] | 6.2 MPD | 12.5 PMDA | DMA | AA/P/carbon tetrachloride. |
| 11–18 | POP | PMDA | DMA | Heat. |
| 19 | MPD | PMDA | DMA | Do. |
| 20 | POP | BTDA | DMA | Do. |

[1] In Examples 1–2, 50 mole percent of the acid groups in the polyamide-acid solution were converted to the triethylammonium salt.
[2] In these examples, the acid groups in the polyamide-acid were converted to the triethylammonium salt.

*Examples 1–2*

These examples were performed using the ingredients and the amounts shown in Table I. The diamine was dissolved in dimethylformamide. Pyromellitic dianhydride was added portionwise with agitation while the solution was externally cooled with circulating water at approximately 15° C. A viscous dope formed and was further diluted with dimethylformamide to give a casting solution containing the polyamide-acid. 50 mole percent of the acid groups in the polyamide-acid solution was converted to the triethylammonium salt.

Films were cast with a doctor knife having a 15-mil opening and dried at 120° for 15 minutes under dry nitrogen in a forced draft oven. The films were fixed over steel plates with magnets, additionally dried for 15 minutes at 120° under nitrogen, and then heated to 300° C. in a hot vacuum oven to convert the polyamide-acid to the polyimide.

The properties of the resulting polyimide films are given in Table II.

TABLE II

| Example | Tensile Modulus | Elongation | Tensile Strength | Retention of Degree of Toughness | Inherent Viscosity |
|---|---|---|---|---|---|
| 1 | 330,000 | 5.8 | 9,400 | [1] 3 | 0.8 |
| 2 | 370,000 | 11 | 11,100 | [1] 3 | 1.4 |

[1] Greater than.

TEST DESCRIPTIONS

*Tensile strength, elongation and tensile modulus.*— These measurements are determined at 23° C. and 50% relative humidity. They are determined by elongating the film sample* or filament at a rate of 100% per minute until the sample breaks. The force applied at the break in pounds/square inch (p.s.i.) is the tensile strength for films; in grams/denier (g.p.d.) is tenacity for filaments. The elongation is the percent increase in the length of the sample at breakage. Initial tensile modulus in p.s.i. or g.p.d. is directly related to film or filament stiffness. It is obtained from the slope of the stress-strain curve at the elongation of 1%; both tensile strength and initial tensile modulus are based upon the initial cross-sectional area of the sample.

Degree of toughness is determined by subjecting a film 1 to 7 mils thick to a series of creasing actions by folding the film through 180° and creasing, followed by folding through 360° and creasing, to complete one cycle. The number of creasing cycles which the film withstands before breaking at the crease line is referred to herein as the "degree of toughness." If a film cannot be creased without breaking, it has a "degree of toughness" of 0, and if the film breaks on the second cycle, its "degree of toughness" is 1, and so on. The "degree of toughness" for films of the present invention must be at least 3.

*Retention of degree of toughness.*—This test is used for determining the effect of heat on the retention of toughness. It involves heating the polymer at 360° C. for 20 minutes under nitrogen, and determining loss of toughness caused by such heating. The retention of the "degree of toughness" must also be at least 3.

*Example 3*

4,4'-diamino-diphenyl propane, 10.35 g., and pyromellitic dianhydride, 10.0 g., were weighed into a beaker and mixed. The solid mixture was added to 75 ml. of dimethylformamide with stirring with cooling (water jacket ca. 11° C.). After the solids had dissolved, the solvent solution obtained had an inherent viscosity as measured in a 0.5% solution of DMA of 0.74. The polyamide-acid solution was diluted with 50 ml. of dimethylformamide and then 5.5 ml. of triethylamine was added.

A portion of the casting dope containing the triethylamine was poured into a mixture of acetic anhydride (50 ml.) and pyridine (120 ml.) in a Waring blender and stirred for 30 minutes. A yellow precipitate was obtained. The reaction appeared to be complete within 5 minutes. The precipitate was filtered, washed with benzene, and dried at 120° C. in a vacuum for 120 minutes. The infrared spectra of the powder showed it to be a polyimide powder.

*Example 4*

Meta-phenylenediamine, 8.7 g., and 3.7 g. of para-phenylenediamine and 25.0 g. of pyromellitic dianhydride were weighed into a flask and mixed. The solid mixture was added portionwise to 100 ml. of dimethylformamide with stirring, while the solution was cooled (water jacket ca. 15° C.). The last portion was added with 50 ml. of dimethylformamide to give a polyamide-acid solution containing 20.6% polymer, by weight. Inherent viscosity as measured in a 0.5% solution of DMA was 1.5.

To a 110 g. portion of the polymer solution was added 9.5 ml. of triethylamine and 50 ml. of dimethylformamide. The polymer started to precipitate and then to this mixture 4.5 ml. of acetic anhydride and 7.5 ml. of pyridine and 10 ml. of acetic acid were added to give a yellow, viscous solution after some stirring. A portion of the polyamide-acid solution was cast with a doctor knife having a 10-mil opening and dried at 120–130° C. for 15 minutes. The films were then converted to the corresponding polyimide by soaking in a large excess of pyridine-acetic anhydride (3/2 by volume) mixture for 12 hours. The films were dried for one hour at 130° C.,

*Samples were cut with a Thwing-Albert Cutter which cut samples ¼" wide.

then for one hour at 250° C. in a vacuum. The films were then heat treated at 380° C. (in air) for 5 minutes to provide tough, flexible films.

Examples 5–8

Meta-phenylenediamine, 6.2 g., and pyromellitic dianhydride, 12.5 g., were weighed into a flask and mixed. The mixture was added portionwise into 50 ml. of dimethylacetamide with stirring and cooling (water jacket ca. 15° C.). The last portion was added with 10 ml. of dimethylacetamide and a viscous polyamide-acid solution was obtained. Eight milliliters of triethylamine was added with 15 ml. of dimethylacetamide to give a solution of the triethylamine salt of the polymer. Films were cast with a doctor knife having a 10-mil opening and dried at 120° C. for 15 minutes in a forced draft oven.

The films were soaked in a chemical bath, consisting of 30 ml. of pyridine, 30 ml. of acetic anhydride, plus 450 ml. of solvent. The solvent in these cases was: Example 5, cyclohexane; Example 6, acetonitrile; Example 7, chloroform; and Example 8, benzene. The completeness of the conversion was checked by heating the film in a 400° C. oven. The films were extracted with dioxane, and dried at 110° C. for one hour. The conversion was complete in Examples 4 and 5 after 16 hours, and in Examples 6 and 7 the conversion was complete after 40 hours. In all cases, the polyimide films obtained were tough and flexible.

Examples 9–10

The polymerization was conducted as in the manner of Examples 4–7 with the exception that 120 ml. of dimethylacetamide was added with the 8.0 ml. of triethylamine to give a solution of the triethylamine salt of the polyamide-acid. Films were cast with a doctor knife having a 15-mil opening and dried at 120° C. for 15 minutes in a forced draft oven.

The films were soaked in chemical baths consisting of 220 ml. of pyridine plus 280 ml. of acetic anhydride in Example 9 and 22 ml. of pyridine plus 28 ml. of acetic anhydride plus 450 ml. of carbon tetrachloride in Example 10. In both cases, acceptable polyimide films (tough, flexible) were obtained. The conversion in Example 9 was complete after 24 hours. In Example 10, the conversion was complete after 4 days. The films were extracted with dioxane and dried at 120° C.

Example 11

To 10 g. (0.002 mole) of a dimethylacetamide solution of the polyamide-acid of pyromellitic dianhydride and bis(4-aminophenyl) ether (10% solids, inherent viscosity of 2.03) was added 1 ml. (0.004 mole) of tri-n-butylamine with stirring. A 5-mil doctor knife was used to cast a film on a glass plate after which the glass plate was placed in an oven at 130° C. for about 3 minutes to remove excess solvent. The film was clamped on a frame and heated at 200° C. for 45 minutes. An infrared spectrum of the resulting 0.20 mil film showed that the normal imide band at 13.75 microns was very intense proving that the product was a polyimide.

Examples 12–13

Tertiary amine salt films were prepared by respectively mixing the stoichiometric amounts of triethylamine and tri-n-butylamine with weighed portions of the 10% solution of polyamide-acid of Example 11; casting films with a 10-mil doctor knife; and, finally, drying the films at 110° for 10 minutes. These films, together with an ordinary film of polyamide-acid, were clamped on frames and gradually heated to 200° C. The films were held at this temperature for 1 hour. The properties of the resulting films are given in Table III.

TABLE III

| Example | Tensile Modulus | Tensile Strength | Elongation |
|---|---|---|---|
| Control | 423,700 | 12,700 | 5.2 |
| 12 | 415,400 | 12,700 | 5.6 |
| 13 | 322,200 | 9,800 | 4.3 |

Examples 14–18

Various polyamide-acid salt films were synthesized by adding stoichiometric equivalents of tertiary amines shown in Table IV to the polyamide-acid solution of Example 11, casting the films with a 1.5 mil H-bar, and drying the films under nitrogen and vacuum at room temperature. Each polyamide-acid salt film was thermally converted at 165° C. to polyimide and the progress of the reaction was followed by the increase of infrared absorption at 13.80 microns. Rates of imidization of these salt films were calculated and compared to that of converting the free polyamide-acid in a control and are presented in Table IV. It will be noted that "$k$" for the salts was at least 4 times the "$k$" for the free acid.

TABLE IV

| Example | Amine | Rate of Imidization [1] |
|---|---|---|
| 14 | N,N-dimethyldodecylamine | 11.6 |
| 15 | N,N-dimethylcyclohexylamine | 6.2 |
| 16 | Tri-n-butylamine | 5.2 |
| 17 | N,N-dimethylaminoethanol | 5.1 |
| 18 | Triethylamine | 4.6 |
| Control | None | 1.0 |

[1] $k$(POP-PMDA(t-amine)$^2$)/$k$(POP-PMDA).

Example 19

To 10.00 g. of a dimethylacetamide solution of m-phenylene pyromellitimide, which was 17.5% in polymer, was added 3.41 g. of N,N-dimethyldodecylamine. This amount of amine corresponds to 1 mole per carboxyl group of the polymer—i.e. 100% salt. The solution was mixed well, centrifuged to remove bubbles, and cast into a film with a 2-mil knife. After drying at reduced pressure under nitrogen for about 3 hours, the infrared spectrum was taken. The film was heated for 2 hours at 120° C. and examined again by infrared.

TABLE V

| | Index [1] of Imide After Heating at 120° C. | |
|---|---|---|
| | 0 hr. | 2 hrs. |
| Example 19 | 0 | 0.314 |
| Control (no amine added) | 0 | 0.116 |

[1] Ratio of infrared absorption at 5.56 microns to infrared absorption at 9.87 microns.

Example 20

A solution of 6.4447 g. of purified 3,3',4,4'-benzophenone tetracarboxylic dianhydride in 50 ml. of purified DMA was treated with a solution of 4.0048 g. of purified 4,4'-diaminodiphenyl ether in 25 ml. of DMA under anhydrous conditions. After stirring near room temperature for 30 minutes, a solution of 4.0 g. of triethylamine in 5 ml. of DMA was added with stirring. A portion of this viscous solution was then poured onto a glass plate. The solvent was evaporated very slowly using an infrared lamp placed 2 feet above the glass plate. When dry, the film was stripped away from the glass plate and placed in an oven at 325° C. under nitrogen for 1 hour. The resulting tough yellow product had a tensile strength of 25,000 p.s.i. and a 14% elongation.

Having fully disclosed the invention, what is claimed is:

1. A process for preparing polyimides which comprises reacting an aromatic diamine with an aromatic tetracarboxylic acid dianyhdride, all four carbonyl groups of said dianhydride being directly attached to an aromatic ring of said dianhydride, in an organic solvent for at least one reactant for a time and at a temperature below 175° C. sufficient to form a polyamide-acid intermediate soluble in said solvent; adding a tertiary amine of the formula:

wherein
$R^1$ is selected from the group consisting of alkyl having at least 2 carbon atoms, aryl nd cycloalkyl,
$R^2$ and $R^3$ are each selected from the group consisting of alkyl, aryl and cycloalkyl, said tertiary amine having a basic ionization constant greater than $1 \times 10^{-7}$, to form the ammonium salt of said polyamide-acid intermediate; and, thereafter, heating said salt at a temperature above 50° C. to convert said salt to an insoluble solid polyimide.

2. A process as in claim 1 wherein said salt is formed into a shaped article prior to the heating step.

3. A process as in claim 1 wherein said dianhydride is selected from the group consisting of pyromellitic dianhydride and 3,3',4,4'-benzophenone tetracarboxylic dianhydride.

4. A process as in claim 1 wherein said tertiary amine is selected from the group consisting of triethylamine, N,N-dimethyldodecylamine, N,N-dimethylbenzylamine, N,N-dimethylethylamine, tri - n - butylamine, N,N - dimethylcyclohexylamine and N,N-dimethylaminoethanol.

5. A process as in claim 1 wherein said diamine is selected from the group consisting of 4,4'-diamino-diphenyl ether, 4,4'-diamino-diphenyl propane, 4,4'-di-amino-diphenyl methane, meta-phenylenediamine and para-phenlyenediamine.

6. A process for preparing polyimides which comprises reacting an aromatic tetracarboxylic acid dianhydride, all four carbonyl groups of said dianhydride being directly attached to an aromatic ring of said dianhydride, with an aromatic diamine having the formula $H_2N-R'-NH_2$ $$H_2N-R-NH_2$$

wherein R' is divalent benzenoid radical selected from the group consisting of

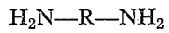

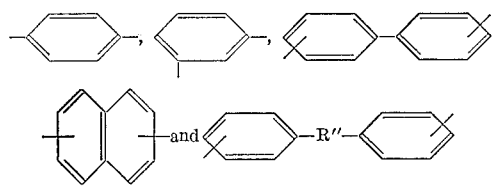

wherein R'' is selected from the group consisting of an alkylene chain having 1–3 carbon atoms, —O—, —S—, —SO$_2$—,

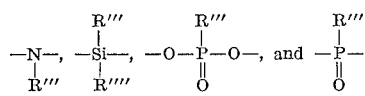

wherein R''' and R'''' are each selected from the group consisting of alkyl and aryl; in an organic solvent for at least one of the reactants, the solvent being inert to the reactants, for a time and at a temperature below 175° C. sufficient to form a polyamide-acid intermediate soluble in said solvent; adding a tertiary amine of the formula:

wherein $R^1$ is selected from the group consisting of alkyl having at least 2 carbon atoms, aryl and cycloalkyl, $R^2$ and $R^3$ are each selected from the group consisting of alkyl, aryl and cycloalkyl, said tertiary amine having a basic ionization constant greater than $1 \times 10^{-7}$, to form the ammonium salt of said polyamide-acid intermediate; and, thereafter, heating said salt at a temperature above 50° C. for a time sufficient to form an insoluble solid polyimide.

7. A process comprising reacting 4,4'-diaminodiphenyl ether and pyromellitic dianhydride in a solvent selected from the group consisting of N,N-dimethylformamide and N,N-dimethylacetamide for a time and at a temperature below 175° C. sufficient to form the corresponding polyamide-acid; adding N,N-dimethyldodecylamine to form the N,N-dimethyldodecylamine salt of the polyamide-acid; forming said salt into a shaped article; and heating said shaped article at a temperature above 50° C. for a time sufficient to form the polyimide.

8. A tertiary amine salt of the polyamide-acid of an aromatic diamine and an aromatic tetracarboxylic acid dianhydride, all four carbonyl groups of said dianhydride being directly attached to an aromatic ring of said dianhydride, said tertiary amine having a basic ionization constant greater than $1 \times 10^{-7}$ and having the formula:

wherein
$R^1$ is selected from the group consisting of alkyl having at least 2 carbon atoms, aryl and cycloalkyl,
$R^2$ and $R^3$ are each selected from the group consisting of alkyl, aryl and cycloalkyl.

9. A salt as in claim 8 wherein said diamine is an aromatic diamine having the formula: $H_2N-R'-NH_2$ wherein R' is a divalent benzenoid radical selected from the group consisting of

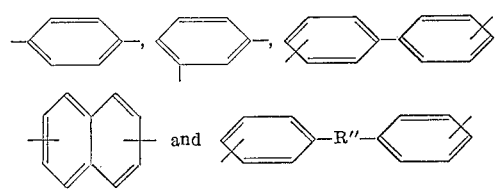

wherein R'' is selected from the group consisting of an alkylene chain having 1–3 carbon atoms, —O—, —S—, —SO$_2$—,

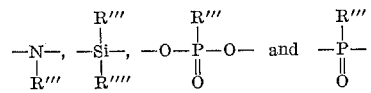

wherein R''' and R'''' are each selected from the group consisting of alkyl and aryl.

10. A salt as in claim 9 wherein said diamine is 4,4'-diamino-diphenyl ether.

11. A salt as in claim 9 wherein said diamine is meta-phenylenediamine.

12. A salt as in claim 8 wherein said dianhydride is pyromellitic dianhydride.

13. A salt as in claim 8 wherein said dianhydride is 3,3',4,4'-benzophenone tetracarboxylic dianhydride.

14. A salt as in claim 8 wherein said tertiary amine is triethylamine.

15. A salt as in claim 8 wherein said tertiary amine is N,N-dimethyldodecylamine.

References Cited by the Examiner
UNITED STATES PATENTS

| | | | |
|---|---|---|---|
| 2,071,250 | 2/1937 | Carothers | 260—78 |
| 2,710,853 | 6/1937 | Edwards et al. | 260—78 |
| 2,712,543 | 7/1955 | Gresham et al. | 260—78 |
| 2,731,447 | 1/1956 | Gresham et al. | 260—78 |
| 2,880,230 | 3/1959 | Edwards et al. | 260—78 |
| 3,049,518 | 8/1962 | Stephens | 260—78 |
| 3,073,784 | 1/1963 | Endrey | 260—78 |
| 3,073,785 | 1/1963 | Angelo | 260—78 |
| 3,123,632 | 3/1964 | Katzschmann | 260—78 |

OTHER REFERENCES

Royals, Advanced Organic Chemistry, 1954, Prentice-Hall, Inc., Englewood Cliffs, N.J., pp. 615–617.

WILLIAM H. SHORT, *Primary Examiner.*